Aug. 29, 1939.  R. BODE ET AL  2,171,390
ANTIFRICTION BEARING
Filed Feb. 16, 1938
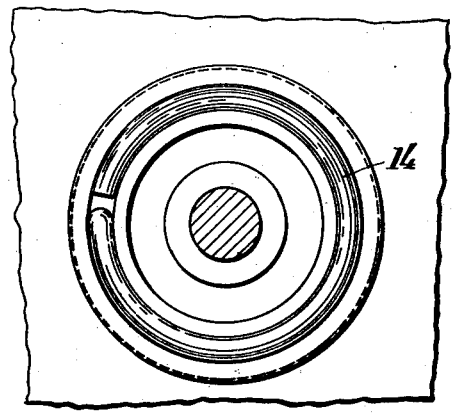
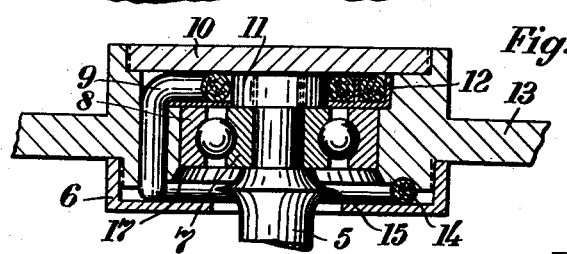
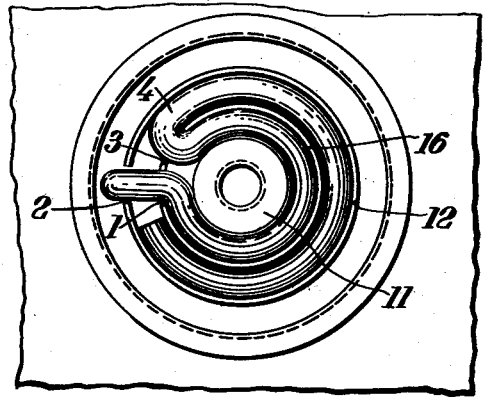
Inventors
Richard Bode,
Achim von Petery,
Attorneys Patented Aug. 29, 1939

2,171,390

UNITED STATES PATENT OFFICE 2,171,390

ANTIFRICTION BEARING

Richard Bode and Achim von Petery, Kiel, Germany, assignors to Anschutz & Co. G. m. b. H., Kiel-Neumuhlen, Germany Application February 16, 1938, Serial No. 190,864
In Germany February 22, 1937

4 Claims. (Cl. 308—187)

Our invention relates to an antifriction bearing and, more particularly, to the lubrication of ball bearings for gyroscopic apparatus.

It is the primary object of our invention to provide a ball bearing for gyroscopic apparatus which includes a lubricating system which will not affect the position of the center of gravity of the system upon movement of the rotating parts about one or more of the axes of the system.

Ball bearings for apparatus of this type require but a small quantity of oil. While, in the absence of a proper lubrication, the bearing would break down after a short period of operation, a surplus of oil will also unfavorably affect the bearing. Therefore, in an apparatus including a gyroscope rotating at a very high velocity and exerting considerable pressure on its ball bearings, the automatic feed of a proper quantity of oil or another suitable lubricating medium is an important requirement. However, there is another important requirement that deserves consideration. In gyroscopic apparatus, in which the gyroscope is mounted to be movable about a plurality of axes, the position of the center of gravity of the gyroscope must not be changed or affected by the consumption of oil or by a flowing motion of the oil within the bearing. The importance of this requirement is illustrated by the fact that, with a static gyroscope mounted to be movable about the three axes, the loss of a tiny drop of oil in a bearing will considerably reduce the accuracy of operation of the instrument.

Therefore, a further object of our invention is to provide an antifriction bearing with improved lubricating means which will ensure the automatic feed to the ball races of a proper quantity of oil and will prevent or minimize any loss thereof.

We attain these and other objects by the provision of an oil absorbing device which surrounds the shaft at one side of the bearing out of contact with the shaft for absorbing any free oil issuing from the bearing at that side and which contacts the shaft at the other side of the bearing for returning the oil thereto. In this manner, we avoid the necessity of providing a supply of free oil which would be liable to flow freely within the bearing and, consequently, to affect the position of the center of gravity of the gyroscope.

We are aware of the British Patent No. 358,663 disclosing a high speed antifriction bearing lubricated by oil which is automatically fed to the races by a wick. This bearing, however, is provided with an oil reservoir including a supply of free oil and, for this reason, is not suited for gyroscopic apparatus.

Further objects of our invention will appear from the following description of a preferred embodiment and the features of novelty will be pointed out in the claims.

In the drawing,

Fig. 1 is an axial section through the bearing and the housing surrounding the same, Fig. 2 is a plan view, the top plate being removed to expose the interior elements thereof to view, and Fig. 3 is a bottom view, the lower cover being removed.

The outer race ring 8 of the ball bearing is mounted on the cylindrical seat of a carrier forming part of a housing 13 whereas the inner race ring 7 is mounted on the shaft or spindle of the gyroscope rotating at a very high speed and is secured in position thereon by a nut 11 having a cylindrical periphery, the diameter of the nut being slightly smaller than that of the race ring 7. The outer race ring 8 is secured against upward axial displacement by an annular member provided with two cylindrical flanges 12 and 16 coaxial with the bearing. This member is inserted in a cylindrical recess of the member 13. A cover plate 10 bears on the flange 12 and is screwed into a suitable internal thread provided in the member 13. The two flanges 12 and 16 are provided with radially aligned recesses 1 and 2. Moreover, a third recess is provided in flange 16 adjacent the recess 1. As will appear from Fig. 2, one end of a wick 4 is inserted between the two flanges 12 and 16. This wick extends through the recess 3 into the annular space left between the flange 16 and the nut 11 and thus surrounds the latter completely, and has light contact therewith. The wick also extends radially through the two recesses 1 and 2 as indicated at 9 toward and through an axial bore provided in the member 13 toward the other side of the bearing. At that side, the end 14 of the wick is positioned within an annular groove provided on the bottom of the member 13, see Fig. 3, and is held therein by a cup 6 which is screwed on external threads of the member 13 and is provided with an opening through which the shaft extends into the housing. Between the cup 6 and the race rings 7 and 8, the shaft 5 is provided with a collar 15 in form of an acute ridge.

The wick end 14 constitutes an oil absorbing device which surrounds the shaft 5 out of contact therewith on the lower side of the bearing 7, 8 and contacts the ring 11, which may be considered a part of the shaft, at the upper side of the bearing. This is an important feature of our invention. The members 13, 10 and 6 constitute a housing provided with an opening through which the shaft 5, 11, 15 extends. The oil absorbing device, which in the present embodiment is formed by the wick, is enclosed in this housing and surrounds the shaft out of contact therewith adjacent the opening of the cup 6, and thus absorbing any free oil which may issue from the bearing.

The operation is as follows: Upon assembly of the bearing the wick or other equivalent oil absorbing device is moistened with so much oil as will be readily absorbed without dripping from the wick in any position thereof. Any additional supply of free oil must be carefully avoided. The end of the shaft which contacts with the oil absorbing device, i. e. the nut 11 in the described embodiment, is provided, through such contact, with a thin film of oil which, owing to the centrifugal force, creeps on the inner race ring 7 of slightly larger diameter and is thus transferred to the revolving balls and to the outer race ring 8 for performing the required lubricating function. From the outer ring 8 the oil creeps along the inclined lower face 17 of the member 13 outwardly and finally arrives at the end 14 of the wick; it is absorbed thereby and then returned through the wick to the upper end of the shaft. Any oil which might creep from the inner race ring 7 downwardly along the shaft 5 will be hurled off the ridge 15 by centrifugal force and will be thrown on the end 14 of the wick surrounding the ridge. Since the absorbing material tends to distribute the absorbed oil evenly, the oil transferred to the end 14 of the wick will be returned to the loop surrounding the upper end of the shaft and thus to the shaft itself. In this manner, the loss of oil is avoided and the continuous feed of a carefully limited quantity of oil to the elements of the ball bearing is ensured.

While the collar 15 thus serves to prevent the loss of oil at the lower end of the housing, the cover plate 10 serves to prevent the loss of oil at the top thereof and, for this purpose, is suitably sealed against the member 13. The cover plate 10 will also prevent the passage through the bearing of air or gas, which might be sucked in by the gyroscope and which would be liable to carry away atomized oil.

Experience has shown that our invention secures proper lubrication for a very extended period of operation without interfering with the proper maintenance of the position of the center of gravity.

While we have described a preferred embodiment of our invention, we wish it to be understood that the same is not limited to the specific details described hereinabove with reference to the illustrated embodiment, but is capable of numerous modifications which will readily occur to anyone skilled in the art. Thus, other absorbing devices may be substituted for the wick. When referring to oil in the claims hereinafter, this term is to be interpreted broadly, to cover any suitable lubricating medium, irrespective of the chemical nature thereof.

What we claim is:

1. The combination with a shaft and an antifriction bearing coordinated thereto, of oil flinging means on said shaft and an oil absorbing device surrounding said shaft without contacting therewith at one side of said bearing to absorb any free oil issuing therefrom and from said oil flinging means and contacting said shaft at the other side of said bearing to return the oil thereto.

2. The combination comprising a housing provided with an opening, a shaft extending through said opening into said housing, an antifriction bearing coordinated to said shaft and mounted in said housing, oil flinging means on said shaft, and an oil absorbing device enclosed in said housing and surrounding said shaft without contacting therewith adjacent said opening to absorb any free oil issuing from said bearing and from said oil flinging means and contacting said shaft at the other side of said bearing to return the oil thereto.

3. Antifriction bearing for gyroscopic apparatus comprising a shaft provided with a collar and with an inner race between said collar and the end of said shaft, a housing surrounding said collar, said inner race and the end of said shaft and provided with an outer race, revolving antifriction elements between said races, a wick encased within said housing and formed with a loop spaced from and surrounding said collar to absorb the oil hurled therefrom by centrifugal force and contacting the end of said shaft to circulate the oil back thereto.

4. Antifriction bearing for gyroscopic apparatus comprising a shaft provided with a collar, an inner ball race ring mounted on said shaft between said collar and the end of said shaft, a housing surrounding said collar, said race ring and the end of said shaft and provided with a seat for an outer race ring and with an axially extending bore, an outer race ring mounted in said housing on said seat, balls between said race rings, and a wick encased within said housing and extending through said bore, one end thereof formed with a loop spaced from and surrounding said collar to absorb oil thrown off therefrom by centrifugal force and oil seeping from between said race rings, the other end of said wick contacting the end of said shaft to circulate the oil back thereto.

RICHARD BODE.
ACHIM von PETERY.